(12) United States Patent  
Reiker

(10) Patent No.: US 6,259,023 B1
(45) Date of Patent: Jul. 10, 2001

(54) ELECTRICAL OUTLET BOX

(75) Inventor: Kenneth H. Reiker, Shalimar, FL (US)

(73) Assignee: Reiker Electric, L.L.C., Shalimar, FL (US)

( * ) Notice: Subject to any disclaimer, the term of this patent is extended or adjusted under 35 U.S.C. 154(b) by 0 days.

(21) Appl. No.: 09/602,884

(22) Filed: Jun. 26, 2000

Related U.S. Application Data

(60) Provisional application No. 60/205,708, filed on May 19, 2000, and provisional application No. 60/141,500, filed on Jun. 28, 1999.

(51) Int. Cl.[7] ................................................. H01R 13/46
(52) U.S. Cl. ........................... 174/60; 174/64; 174/65 R; 220/3.3; 220/3.8
(58) Field of Search ................................. 174/58, 59, 60, 174/64, 65 R; 220/3.3, 3.92, 3.94, 4.02, 3.8; 29/825, 729

(56) References Cited

U.S. PATENT DOCUMENTS

| | | | |
|---|---|---|---|
| 2,277,217 | 3/1942 | Faber | 20/4 |
| 2,297,862 | 10/1942 | Backmann | 220/3.7 |
| 2,320,400 * | 6/1943 | Bedell | 220/3.6 |
| 2,738,482 | 3/1956 | Benander | 339/164 |
| 2,920,303 | 1/1960 | Johnson | 339/97 |
| 3,240,869 | 3/1966 | Jureit | 174/135 |
| 3,297,815 | 1/1967 | Drettmenn | 174/48 |
| 3,350,501 | 10/1967 | Jureit | 174/135 |
| 3,417,192 | 12/1968 | Elm | 174/59 |
| 3,553,346 | 1/1971 | Ballantyne | 174/48 |
| 3,662,085 | 5/1972 | Robinson et al. | 174/48 |
| 3,724,795 | 4/1973 | Callanan | 248/360 |
| 3,860,739 | 1/1975 | Kloth et al. | 174/48 |
| 3,935,637 | 2/1976 | Bunnell | 29/628 |
| 3,951,502 | 4/1976 | Bromberg | 339/99 R |
| 4,082,915 | 4/1978 | Silver | 174/51 |
| 4,087,150 | 5/1978 | Kubik | 339/97 P |
| 4,165,443 | 8/1979 | Figart et al. | 174/53 |
| 4,195,194 | 3/1980 | Kuster et al. | 174/59 |
| 4,297,525 * | 10/1981 | Bowden, Jr. | 174/58 |
| 4,306,109 | 12/1981 | Nattel | 174/51 |
| 4,428,492 | 1/1984 | Jorgensen | 220/3.94 |
| 4,500,746 | 2/1985 | Meehan | 174/48 |
| 4,534,486 | 8/1985 | Eidson | 220/241 |
| 4,669,804 | 6/1987 | Munroe | 439/398 |
| 4,733,330 | 3/1988 | Tanaka et al. | 361/356 |
| 4,787,587 | 11/1988 | Deming | 248/205.1 |
| 4,918,258 | 4/1990 | Ayer | 174/53 |
| 4,924,646 | 5/1990 | Marquardt | 52/221 |
| 5,178,350 | 1/1993 | Vink et al. | 248/27.1 |

(List continued on next page.)

OTHER PUBLICATIONS

Search Report dated Oct. 4, 2000, issued in PCT application No. PCT/US00/17556, filed Jun. 26, 2000.

Primary Examiner—Dean A. Reichard
Assistant Examiner—Dhiru R Patel
(74) Attorney, Agent, or Firm—Myers & Associates, Intellectual Property Law, P.C.

(57) ABSTRACT

An electrical outlet box includes channels in a female member for receiving in spaced apart relationship three conductors of an uncut electrical cable. One or more sets of three receivers mounted in a male member for electrically engaging each conductor interconnects the conductors of the cable and defines an electrical socket of a socket assembly of the electrical outlet box. A cover is attachable to the male member for covering the space between the socket assembly and the surrounding wall board aperture. Fittings are included and formed as part of the electrical outlet box to permit back to back attachment of a pair of electrical outlet boxes and for side by side mounting in a ganged manner of two or more electrical outlet boxes. Routing of the cable in slots in the studs of a wall is described along with a retainer for retaining the cable in the slots.

53 Claims, 9 Drawing Sheets

U.S. PATENT DOCUMENTS

| | | | |
|---|---|---|---|
| 5,180,886 | 1/1993 | Dierenbach et al. | 174/66 |
| 5,203,711 | 4/1993 | Bogiel | 439/215 |
| 5,223,673 | 6/1993 | Mason | 174/53 |
| 5,486,650 | 1/1996 | Yetter | 174/53 |
| 5,509,560 | 4/1996 | Nash | 220/3.9 |
| 5,683,267 | 11/1997 | Ribbeck et al. | 439/395 |
| 5,700,978 | 12/1997 | Huff | 174/66 |
| 5,709,566 | 1/1998 | Tsuji et al. | 439/397 |
| 5,720,626 | 2/1998 | Dobbelaere et al. | 439/397 |
| 5,744,750 | 4/1998 | Almond | 174/49 |
| 5,796,585 | 8/1998 | Sugiyama et al. | 361/735 |
| 5,895,888 | 4/1999 | Arenas et al. | 174/66 |
| 5,920,034 | 7/1999 | Saka et al. | 174/59 |

\* cited by examiner

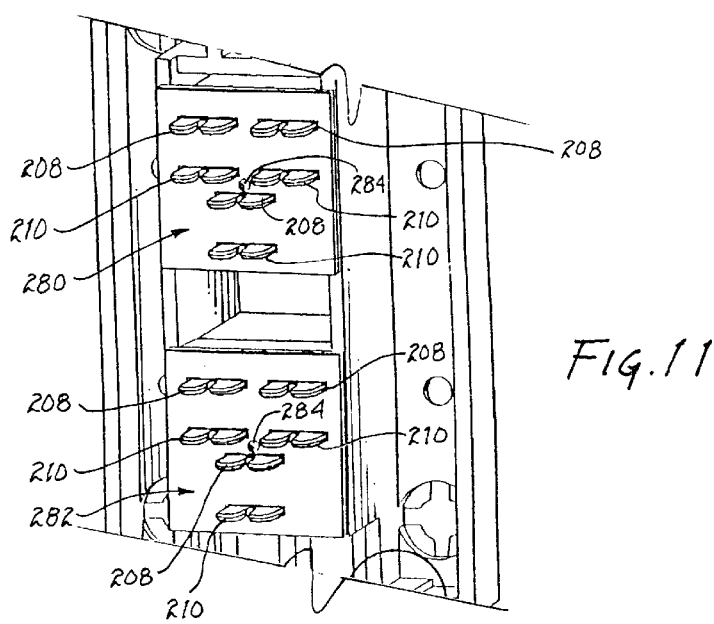
FIG. 11
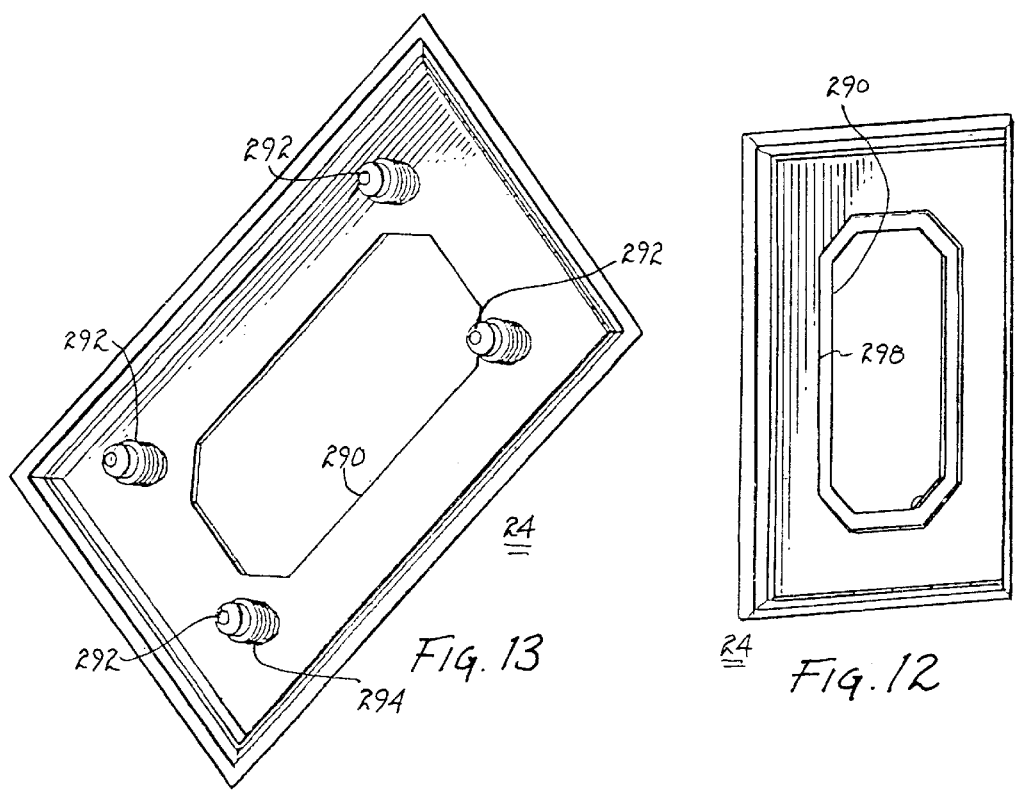
FIG. 13
FIG. 12
FIG. 14

ELECTRICAL OUTLET BOX

CROSS-REFERENCE TO RELATED APPLICATIONS

The present application discloses information common with and claims priority to a provisional application entitled "Electrical Outlet Box", filed Jun. 28, 1999 and assigned Ser. No. 60/141,500, and to a provisional application entitled "Electrical Receptacle With Straight-Through Wiring", filed May 19, 2000 and assigned Ser. No. 60/205,708, which applications are incorporated herein by reference and describe an invention made by the present inventor.

BACKGROUND OF THE INVENTION

1. Field of the Invention

The present invention relates to electrical outlets and, more particularly, to an electrical outlet box for receiving and electrically engaging an uncut three conductor electrical cable for providing electrical power to sockets selectively engageable by conventional electrical plugs.

2. Description of Related Art

Conventional wall mounted electrical outlets include a box, whether of metal or plastic, for receiving three conductor electrical cables. The terminal end of each conductor is mechanically fastened to corresponding electrical contacts of a conventional socket assembly. One or more apertures in the box are present to permit ingress of a cable and egress of another cable. In the event of the latter, the ends of each conductor of such cable must be attached to the corresponding electrical connections of the outlet socket assembly. Alternatively, corresponding conductors of each cable must be electrically and mechanically secured to one another with a device known as a wire nut. A pig-tail conductor is secured by each wire nut to each conductor to provide electrical power to the corresponding electrical contact of the socket assembly. When two sockets of each socket assembly are present, as is conventional, further pig-tails must be used to connect the sockets in parallel.

The amount of time and effort to cut and then insert the end of each cable into the electrical box is time consuming. Additional time and numerous separate operations must be carried out to effect the appropriate electrical connections.

Each cable must be routed through the studs of a wall from one location of an electrical box to another. This requires drilling holes in each intervening stud and threading the cable therethrough. Such work is time consuming and laborious.

Conventional electrical outlet boxes are secured to a wall stud by nails or the like. A cutout is provided in the wall board of the wall through which the electrical outlet box extends to position the socket assembly essentially flush with the exterior surface of the wall board. An apertured cover plate, penetrably receiving the terminal end of each socket of the socket assembly, is affixed to the electrical outlet box by screws. Often, due to sloppy workmanship or inattention, the electrical outlet box is not in proper alignment with the wall board. This results in a skewed attachment of the cover plate since no provision for aligning the cover plate with the wall board is provided. The result is aesthetically displeasing.

Generally, the major expense attendant wiring a house, or any building, is the cost of the labor involved as the parts, including the cables, are inexpensive relative to the total cost. By reducing the labor costs of skilled electricians through a reduction in time spent, significant savings may be effected.

SUMMARY OF THE INVENTION

The female member of an electrical outlet box includes an apertured flange for attachment by nails or screws to a stud. After attachment, an the uncut conductor cable is laid through the electrical outlet box after the insulating sheath surrounding the three conductors has been cut and removed to expose the three insulated conductors. Each conductor is placed within a corresponding channel to physically spread the conductors apart from one another. A male member of the electrical outlet box is inserted into the female member, which insertion causes receivers to penetrate the insulation of each respective conductor and make an electrical contact therewith. Each receiver corresponds with a prong of a conventional grounded three prong plug to electrically connect the plug with the corresponding electrical conductors upon insertion of the plug into a socket. Thereby, all of the conventional steps of cutting and attaching the electrical conductors extending into an electrical outlet box are eliminated. Each receiver may include one or more spring loaded tangs for receiving and electrically connecting a further conductor of a further cable. A positionable cover plate is placed flush with the surface of the wall board surrounding the electrical outlet box and accommodates for any misalignment of the electrical outlet box relative to the surface of the wall board. Male and female attachments are provided in each electrical outlet box to permit side by side and/or back to back mounting of a plurality of electrical outlet boxes. Moreover, a single uncut cable is serially routed through each electrical outlet box. To enhance routing of cables through a wall, a slot may be cut in each stud to receive the cable and eliminate threading of the cable through a hole. A retainer engages the stud to maintain the cable in the slot.

It is therefore a primary object of the present invention to provide an electrical outlet box which provides electrical power to a conventional outlet without requiring cutting of any conductors of an electrical cable supplying electrical power to the electrical outlet box.

Another object of the present invention is to provide an easy to install and electrically connect electrical outlet box.

Still another object of the present invention is to provide a two part plastic electrical outlet box which upon assembly automatically provides electrical connection between a socket and an uncut electrical cable laid therein.

Yet another object of the present invention is to provide an electrical outlet box of non-electrically conductive material except for receivers electrically connecting conductors of an uncut electrical cable passing therethrough to provide electrical power to a plug plugged into a socket.

A further object of the present invention is to provide an inexpensive electrical outlet box installable by an electrician with minimal instruction.

A yet further object of the present invention is to reduce the costs of electrically wiring a wall of a building or other facility.

A still further object of the present invention is to provide a method for inexpensively wiring a building or other facility.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 11 illustrates cover plates attached to the male member for retaining the receivers within their respective cavities;

FIG. 12 illustrates a cover for attachment to the male member of the electrical outlet box;

FIG. 13 illustrates the bottom of the cover;

FIG. 14 is a side view of the cover;

DESCRIPTION OF THE PREFERRED EMBODIMENT

Figure 1:
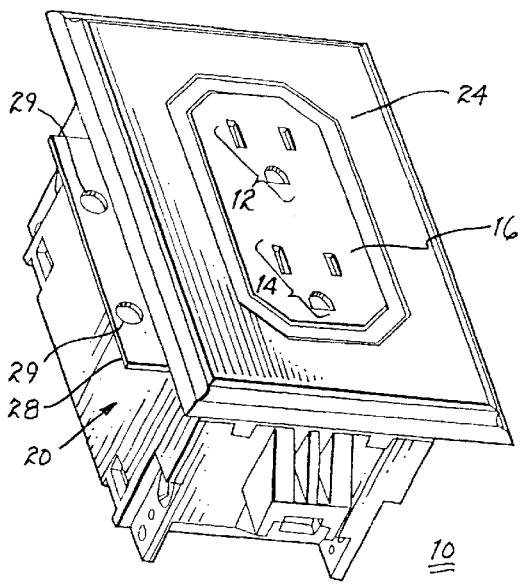
FIG. 1 is an isometric view of the top and two sides of an electrical outlet box.

Referring to FIG. 1, there is shown an electrical outlet box 10 for providing electrical power to each of sockets 12, 14 disposed in socket assembly 16. The electrical outlet box includes a female member 20 into which a male member 22 (see FIG. 2) is attached and a cover 24 having an aperture 26 through which socket assembly 16 protrudes. A flange 28 extends laterally from female member 20 and includes apertures 29 for penetrably receiving nails, screws, or the like to attach electrical outlet box 10 adjacent a wall stud of a wall and serves in the manner of a mounting for the electrical outlet box.

Figure 2:
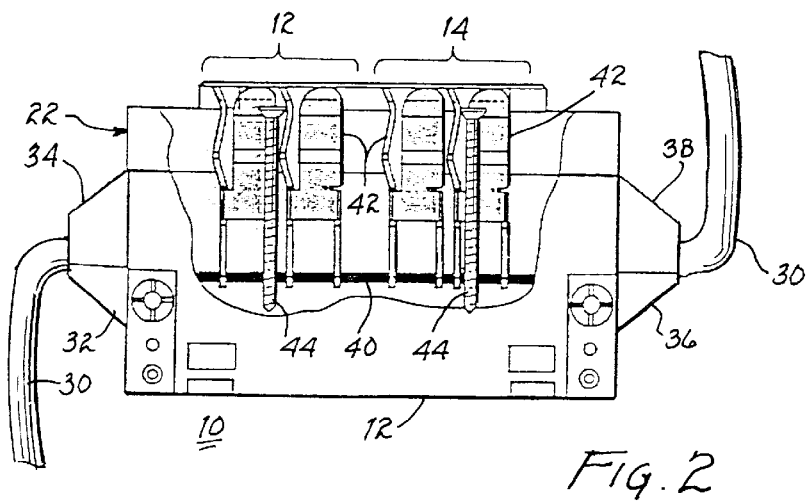
FIG. 2 is a partial cut-out side view of the electrical outlet box showing certain components.

An overview of electrical outlet box 10 is provided in FIG. 2. An electrical cable 30 enters the electrical outlet box intermediate the junction between female member 20 and male member 22 through an aperture defined by ledges 32, 34. Similarly, the cable exits from the electrical outlet box intermediate the male and female members through an aperture defined by ledges 36, 38. Ledges 32, 36 are a part of female member 20 and ledges 34, 38 are a part of male member 22. The portion of cable 30 interior of the electrical box has been stripped of its external sheath to expose the conventional three insulated conductors, of which one conductor is ground. These three insulated conductors are collectively identified by reference numeral 40. Each of three channels are formed in female member 20 to receive in spaced apart relationship one of conductors 40. Socket 12, formed in male member 22, includes three receivers 42 of identical configuration and located by male member 22 in such way that each receiver corresponds with one of conductors 40. Receivers 42 of socket 14 are similarly located. On joining the male member with the female member, each of receivers 42 penetrates the insulation about the respective conductor to make electrical contact therewith. Thereby, each of sockets 12 and 14 are in electrical contact with the three conductors of cable 30 and will provide electrical power to a conventional grounded three prong plug plugged into either of sockets 12, 14. After male member 22 has been inserted into female member 20, it is retained in place by a plurality of screws or bolts 44. From this description, it will be apparent that cable 30 is not cut to provide electrical power to either of sockets 12 or 14 and the cable is continuous through the electrical outlet box.

Figure 3:
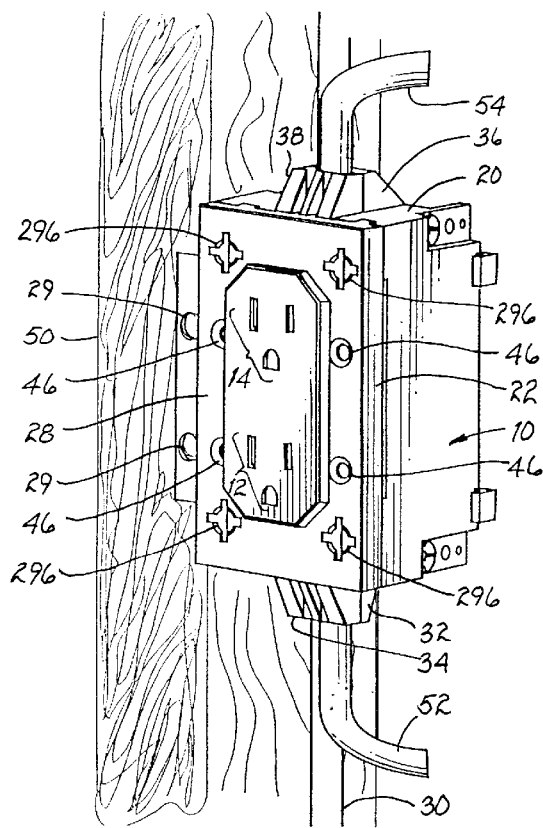
FIG. 3 illustrates the electrical outlet box attached to a stud of a conventional wall with a plurality of conductors extending to and from the electrical box.

FIG. 3 illustrates a typical mounting of electrical outlet box 10. Female member 20 is placed adjacent a stud 50 found in a typical wall construction to locate flange 28 adjacent a surface of the stud. The female member is secured to the stud by bolts or screws penetrating apertures 29 into threaded engagement with the stud. Alternatively, nails or tacks may be used for this purpose or other fastening devices may be used. After the female member has been mounted on the stud, cable 30 is laid therein. Upon insertion of male member 22, sockets 12 and 14 will be in electrical contact with the corresponding conductors within the cable. Screws or bolts 44 (see FIG. 2) are inserted through apertures 46 and into the threaded engagement with the female member to retain the male member in place. As will be discussed in further detail below, the conductors within additional cables 52, 54 may be attached to corresponding receivers 42 of either of sockets 12, or 14 to provide electrical power to other locations.

Figure 4:
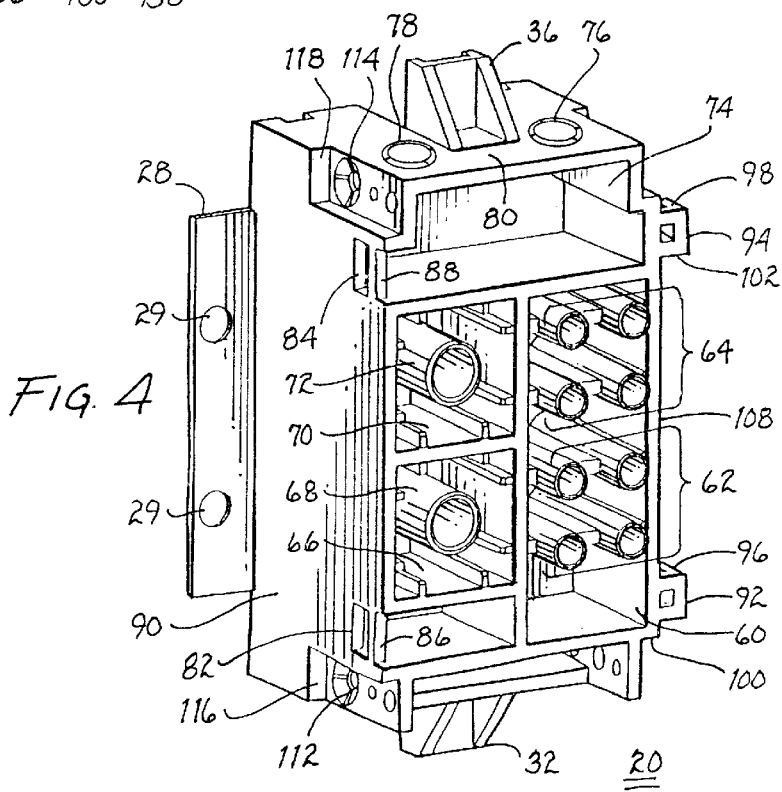
FIG. 4 is an isometric view of the bottom and two sides of the female member of the electrical outlet box.

FIG. 4 illustrates a view of the bottom of female member 20. The bottom is divided into essentially four sections. Section 60 includes two sets of four tubes 62 and 64. Section 66 includes a single tube 68 having a diameter essentially corresponding with a circle inscribed by the tubes of each set of tubes 62 and 64. Section 70 also includes a tube 72 of a diameter equivalent to a circle inscribed by either of set of tubes 62, 64. Upon placement of two electrical boxes back to back, tubes 68, 72 of one female member will nest within set of tubes 64, 62, respectively, of the other female member. By having the fit between the respective tubes a tight fit, the two electrical outlet boxes will be secured to or interlocked with one another. Thus, these tubes and sets of tubes form a mounting means or interlocking means for securing two female members (electrical outlet boxes) back to back.

Figure 7:
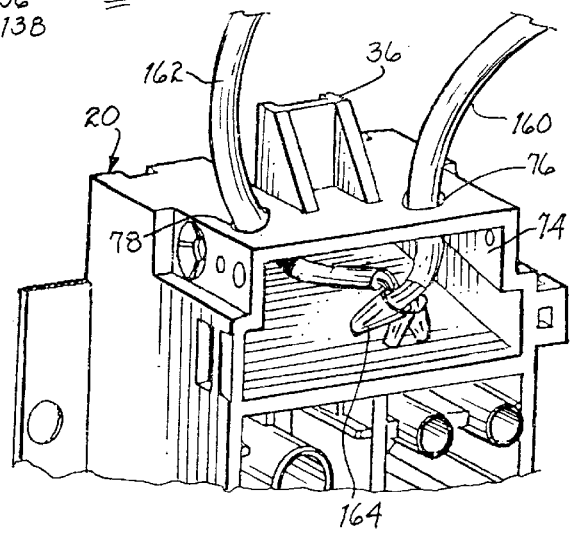
FIG. 7 illustrates an isolated compartment within the female member of the electrical outlet box for electrically connecting two or more conductors.
Figure 8:
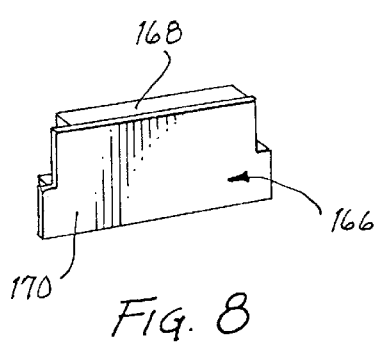
FIG. 8 illustrates a cover for closing the compartment illustrated in FIG. 7 to shield any electrical connection made therein.

Section 74 is essentially a closed compartment that may be covered by a cover shown in FIG. 8. A pair of knockouts 76, 78 are disposed in wall 80. By removing the knockouts, conductors (as shown in FIG. 7) are insertable through the resulting apertures and may be electrically joined to one another within section 74. Thus, section 74 provides a mechanically closed compartment to shield any conductors electrically joined therein and precludes the possibility of an electrical hazard as a result of any exposed conductors.

Slots 82, 84 along with indentations 86, 88 are formed in side wall 90. These slots and indentations correspond with snap studs 92, 94 (see also FIG. 5) to mechanically lock (interlock) adjacent female members to one another to create a side by side gang of electrical outlet boxes mechanically interconnected with one another. That is, lip 96 of snap stud 92 of one female member is placed adjacent the inner surface of wall 90 of another female member. Lip 98 of snap stud 94 is similarly placed adjacent the rear surface of wall 90 of the other female member. Upon such joining, base 100 of snap stud 92 and base 102 of snap stud 94 will rest within indentations 88, 86, respectively. A protrusion 104 at the extremity of lip 96 and a protrusion 106 at the extremity of lip 98 will become lodged in slots 82 and 84, respectively to lock the interconnection therebetween. To accommodate such side by side mounting of a pair of female members, an indentation in the wall 108 (which is opposed to wall 90), includes an indentation 110 to accommodate and receive flange 28. Thereby, wall 90 of one female member will be flush or adjacent wall 108 of a joined female member. Thus, these elements form a mounting means or interlock means for receiving two female members (electrical outlet boxes) side to side.

Apertures 112, 114 are formed in indentations 116, 118 of wall 90. Corresponding apertures 120, 122 are disposed in indentations 124, 126 in wall 108 of the female member (see FIG. 5). These apertures are intended to permit insertion of bolts to mechanically secure two or more female members adjacent one another in ganged fashion. Each of apertures 112, 114, 120 and 122 may include a spider shaped head which would flatten out in the event of over tightening of a penetrating bolt and thereby prevent cracking or damage to the wall of the corresponding indentation.

Figure 5:
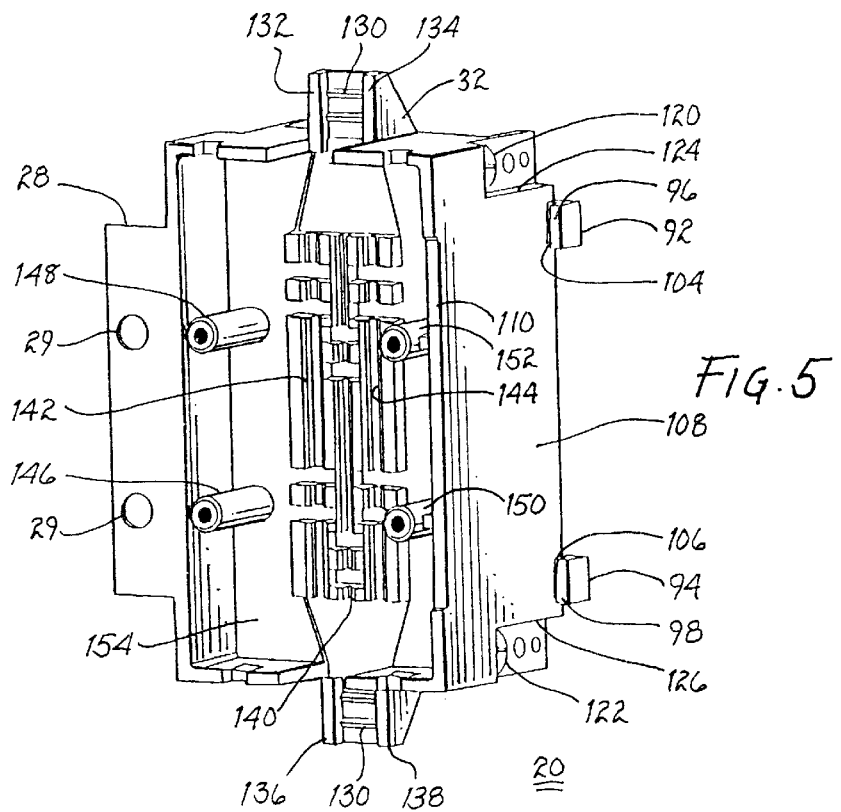
FIG. 5 is an isometric view of the interior and two sides of the female member of the electrical outlet box.

The interior of female 20 is illustrated in FIG. 5. A pair of ledges 36, 32 extend from opposed ends of the female member to provide support for a cable extending through the female member. To lock the cable in place on their respective ledges, each of the ledges may include one or more laterally oriented ridges 130. Furthermore, ledge 32 includes side walls 132, 134 and ledge 36 includes side walls 136, 138 to prevent lateral movement of a cable. A central segmented channel 140 is disposed intermediate ledges 32, 38 for receiving the insulated ground conductor of a cable. Further segmented channels 142, 144 are disposed on opposed sides of channel 140 for receiving the remaining two insulated conductors of the cable. Necessarily, the sheath of the cable surrounding the three conductors must be removed along the segment of the cable generally corresponding to the interior length of female member 20.

Figure 6:
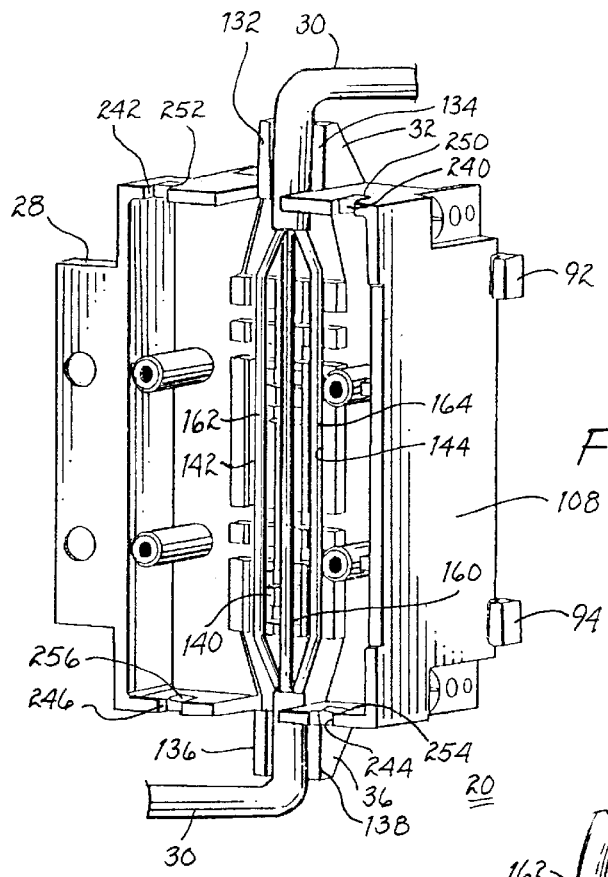
FIG. 6 illustrates a cable laid within the female member of the electrical outlet box.

Four posts 146, 148, 150 and 152 extend upwardly from bottom 154 of the female member. Upon placement of the flange 28 from an adjacent female member within indentation 110, apertures 29 of such flange penetrably engage posts 150, 152 to lock the flange within the female member and provide a robust attachment between the two adjacent female members. FIG. 6 is similar to FIG. 5 except that cable 30 has been inserted therein and electrical conductors 160, 162 and 164 have been lodged within segmented channels 140, 142 and 144, respectively. Similarly, the cable has been placed upon ledges 32, 36 within their respective side walls 132, 134 and 136, 138.

FIG. 7 specifically illustrates section 70 (see FIG. 4) available for containing an electrical connection between conductors 160, 162 inserted through knockouts 76, 78, respectively. The ends of the conductors may be electrically interconnected by use of wing nuts 164 or the like. To eliminate an electrical hazard as a result of an exposed uninsulated conductor within section 74, a cover 166, as shown in FIG. 8, may be used to close section 74. The cover may include a depending skirt 168 for insertion adjacent the interior upper edge of section 74. Top 170 of the cover may be flush with the top of the walls defining section 74. Preferably, cover 166 is secured in place by a snap fit, well known to those skilled in the art of making covers.

Figure 9:
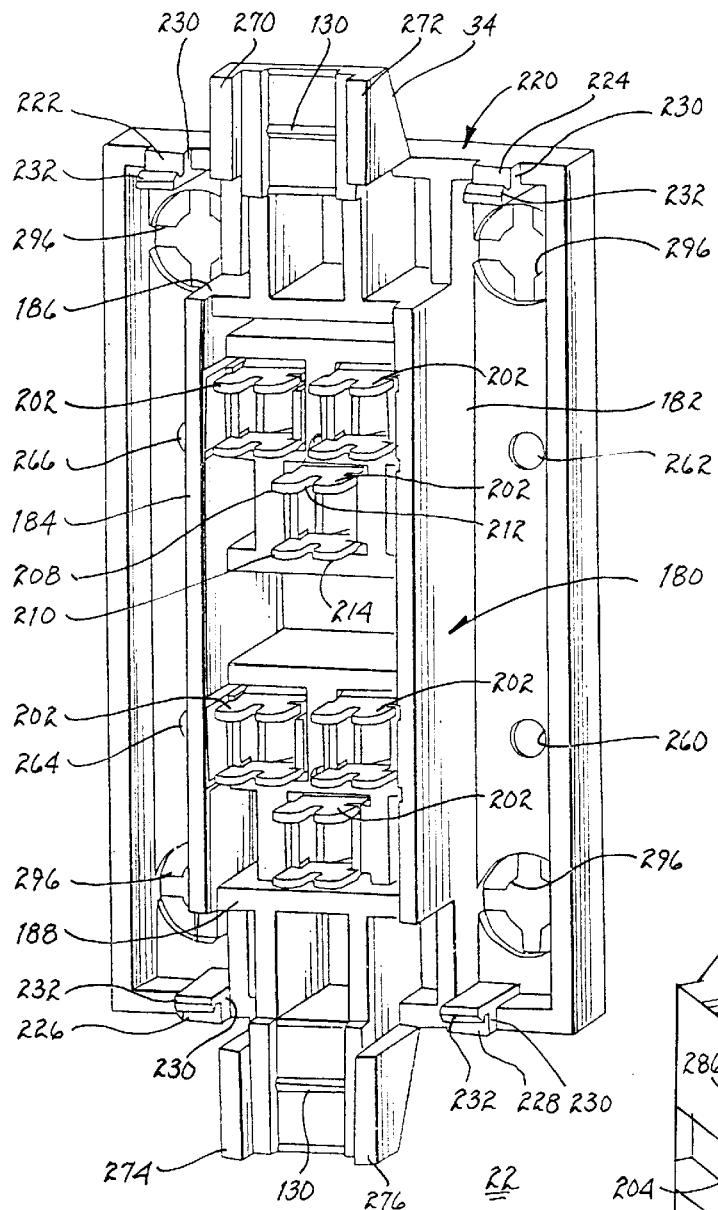
FIG. 9 is an isometric view of the interior of the male member.
Figure 10:
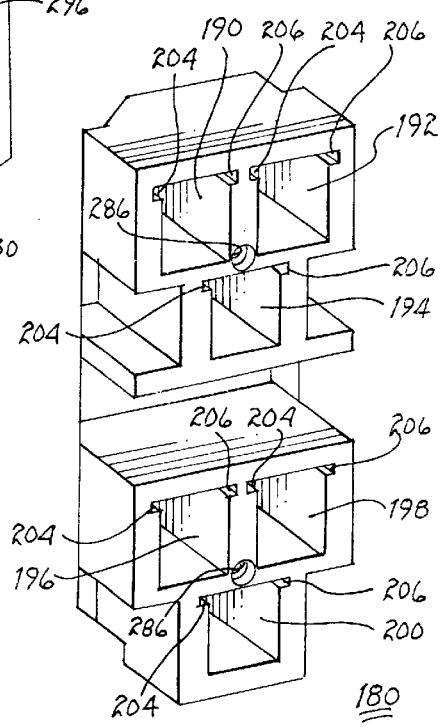
FIG. 10 is a view of the cavities disposed in the male member for supporting the receivers.
Figure 15:
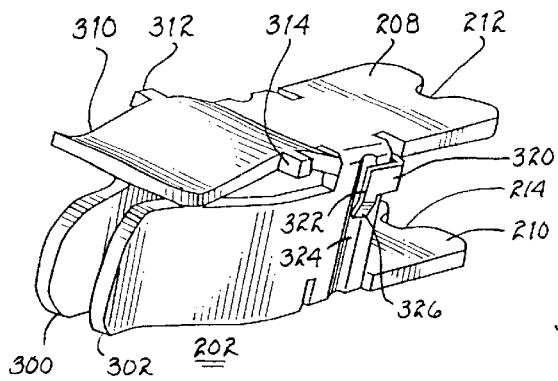
FIG. 15 is an isometric view of two sides of a receiver.
Figure 16:
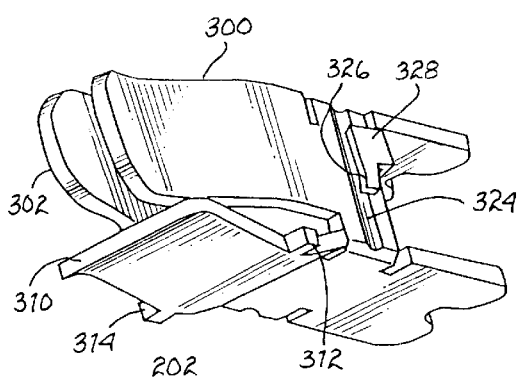
FIG. 16 is an isometric of two other sides of a receiver.

Male member 22 will be described with joint reference to FIGS. 9, 10 and 11. Internal central section 180 defining two sets of three cavities each is particularly shown in FIG. 10. These sets of cavities are bounded by side walls 182, 184, 186 and 188. Cavities 190, 192 and 194 correspond with socket 12 and cavities 196, 198 and 200 correspond with socket 14 (see FIG. 1). A flexibly resilient receiver is lodged within each of cavities 190,192, 194, 196, 198 and 200. Each of the cavities includes a pair of slots 204, 206 for receiving corresponding keys of a receiver. Each receiver includes a slotted pair of tabs 208, 210 defining slots 212, 214, respectively. The edges of these tabs, including the edges of slots 212, 214 may be tapered or beveled to provide a cutting function for penetrating the insulation surrounding a conductor engaged by the slots. As discussed above with respect to FIGS. 5 and 6, the spaces of segmented channels 140, 142, 144 relate to slots 204, 206 of tabs 208, 210 of the corresponding receiver to permit translation of each pair of receiver tabs relative to a conductor to be gripped to permit engagement of the slots of each receiver with the respective conductor. That is, upon attachment of the male member to the female member, the receivers will come into engagement with a corresponding one of the conductors to create an electrical connection between each receiver and its corresponding conductor whereby power is applied to each of sockets 12 and 14. The tabs of the receivers extend into the discontinuities of the respective ridges defining the channels (as shown in FIGS. 5 and 6).

Male member 22 includes a cover element 220 essentially conforming with the walls of female member 20. Each of male studs 222, 224, 226 and 228 depends from the edge of cover element 220 and includes a base section 230. A lip 232, including a protrusion extending therefrom, terminates each male stud. Referring to FIG. 6, there are illustrated four slots 240, 242, 244 and 246 disposed in the edges of opposed wall sections of the female member. These slots are sized to receive base 230 of corresponding male studs 222, 224, 226 and 228. Apertures 250, 252, 254 and 256 are disposed adjacent slots 240, 232, 244 and 246, respectively, for engagement by in a snap fit configuration the corresponding with lip 232 of each male stud. Thereby, male member 22 is initially attached to female member 220 with a snap fit. The distance between pair of slots 240, 242 is a first distance and the distance between pair of slots 244, 246 is a second distance. To insure correct orientations of the male member with the female member pair of male studs 222, 224 are the first distance apart and pair of male studs 226, 228 are the second distance apart. As mating of the male member with the female member can only come about if the male studs are coincident with the slots, the male member can be attached only one way with the female member.

Apertures 260, 262, 264 and 266 in female member 22 correspond with posts 146, 148, 150 and 152, respectively, of male member 20. After the initial snap fit attachment of the male member with the female member, bolts or screws 44 (see FIG. 2) are inserted through these apertures into threaded engagement with the corresponding posts to prevent any inadvertent disengagement between the male and female members.

Ledges 34, 38 of male member 22 are similar to ledges 32, 36 of female member 20 and serve essentially the same function. That is, each of ledges 34, 38 includes one or more lateral ridges 130 for compressively engaging a part of the cable partially incased between side walls 270, 272 of ledge 34 and side walls 274, 276 of ledge 38. The side walls of ledges 34, 38 come into engagement with the corresponding side walls of ledges 32, 36 to incase the cable between corresponding pairs of ledges. Thereby, movement of the cable into and out of or lateral of electrical outlet box 10 is essentially precluded.

Referring specifically to FIG. 11, there is shown an apertured plate 280 for penetrable engagement by the pairs of tabs 208, 210 of each of receivers 202 forming a part of socket 12. A similar plate 282 provides penetrable engagement through slots for each of tabs 208, 210 of receivers 202 forming a part of socket 14. Each of plates 282, 283 is retained in place by means such as a screw 284 in threaded engagement with corresponding apertures 286 of central section 180 (see FIG. 10). The purpose and function of plates 280, 282 is to provide rigidity to the tabs of the respective receivers to insure penetration of the insulation about the respective conductor to be electrically engaged. That is, these plates serve as retention means to preclude the tabs from bending or becoming skewed during engagement of male member 22 with female member 20 and preclude disengagement of the receivers from their respective cavities.

FIGS. 12, 13 and 14 illustrate cover 24 (see FIG. 1). The cover includes a central aperture 290 for penetrably receiving socket assembly 16 of male member 22. During attachment of the electrical outlet box to a wall stud (see FIG. 3), the wall stud may be twisted or warped to preclude the exterior planar surface of the socket assembly from being parallel with the surface of the wall board to be attached to the stud. To accommodate such skewed positioning of electrical outlet box 10 and to provide an aesthetically and visually pleasing presentation, cover 24 can be affixed or attached to the male member in a skewed relationship therewith that conforms with the planar surface of the wall board. Studs 292 extend from the undersurface of the cover and include a plurality of deformable bells 294. Upon attachment of cover 290 to male member 22, studs 292 are forced into corresponding ones of apertures 296 formed in cover element 220 of male member 22 (see FIGS. 3 and 9). Apertures 290 may have a spider shaped head or other configuration of ridged or flexible flanges cooperating with bells 294 to insure engagement and positionable rigidity irrespective of the depth to which studs 292 are forced into the apertures. Thereby, the cover may be skewed relative to the major plane defined by the male member and yet the cover will be flush with the surface of the wall board. By including one or more bevels 298 adjacent aperture 290, any planar alignment with socket assembly 16 will not be readily visually perceivable. The perimeter of the cover may be beveled, as indicated or of other configuration dictated primarily by aesthetic considerations.

Referring directly to FIGS. 15, 16, 17 and 18, each receiver 202 (see FIG. 9) will be described in further detail. Each receiver 202 includes a pair of resilient arms 300, 302 in facing relationship to grip one of blade prongs 304 or cylindrical prong 306 (ground) of conventional electrical plug 308. A further resilient arm 310, orthogonally related to arms 300, 302, includes a pair of opposed keys 312, 314. These keys slide into slots 204, 206 of the corresponding one of cavities 190, 192, 194, 196, 198 and 200 (see FIG. 10). As discussed above, a pair of tabs 208, 210 include slots 212, 214. The depth of the slots must be sufficient to engage a corresponding insulated conductor (see FIG. 6) and of appropriate width to penetrate the insulation of the conductor and make electrical contact with the conductor. To enhance such penetration of the insulation and electrical engagement, the edges of the slots may be beveled to a more or less sharp edge (see FIG. 18). Alternatively, if the material of tabs 208, 210 is sufficiently thin a beveled or sharpened edge may not be necessary.

To provide an electric power take off from within electrical outlet box 10 without cutting or severing any conductor of cable 30, a resilient clamp 320 may be formed on one or both sides of receiver 202. This clamp includes an arm 322. A channel or depression 324 is disposed beneath the arm and in general alignment therewith. To make an electrical connection, the uninsulated end of an electrical conductor is placed within depression 324 under arm 322. As the arm is downwardly biased and resilient, it will tend to grip the conductor and retain it in place. To enhance retention of the conductor, end 326 of the arm may be bent downwardly, as shown. A further clamp 328 may be disposed on the other side of receiver 202 to permit attachment of two independent conductors to each receiver. As particularly shown in FIG. 17, each of receivers 202 includes a clamp 328 for engaging the terminal ends of respective ones of conductors 340, 342 and 344.

Figure 18:
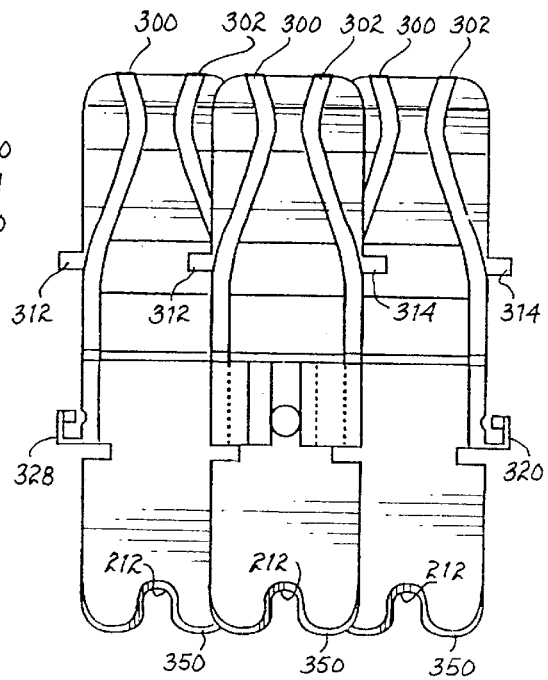
FIG. 18 is a side view of the relationship of three receivers mounted within a male member of the electrical outlet box.
Figure 17:
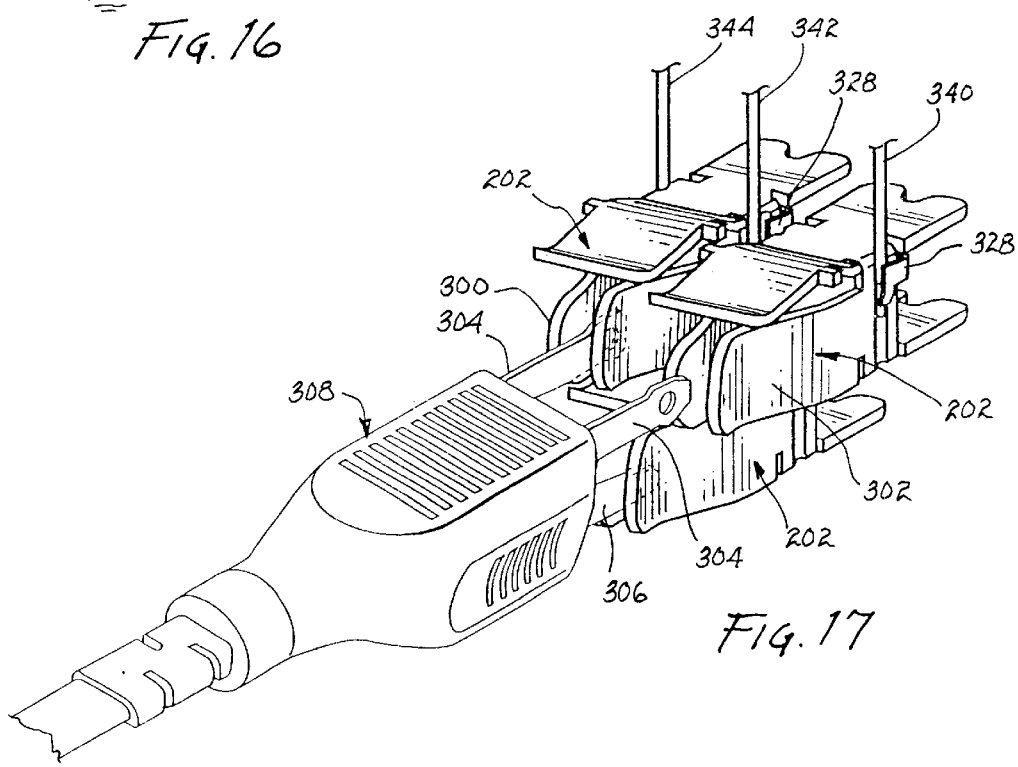
FIG. 17 is a representative view of a conventional grounded electrical plug engaging a set of three receivers mounted within the male member of the electrical outlet box, and illustrates an electrical conductor electrically attached to and extending from each receiver.

FIG. 18 is primarily an illustration of the relative positions of three receivers 202 forming the electrical interconnections between the three conductors of a cable and a plug 308 to be plugged into one of sockets 12, 14. A beveled edge 350 may be formed in each of slots 212. As shown, such beveled edge may extend further along the edge of the corresponding tab.

Figure 19:
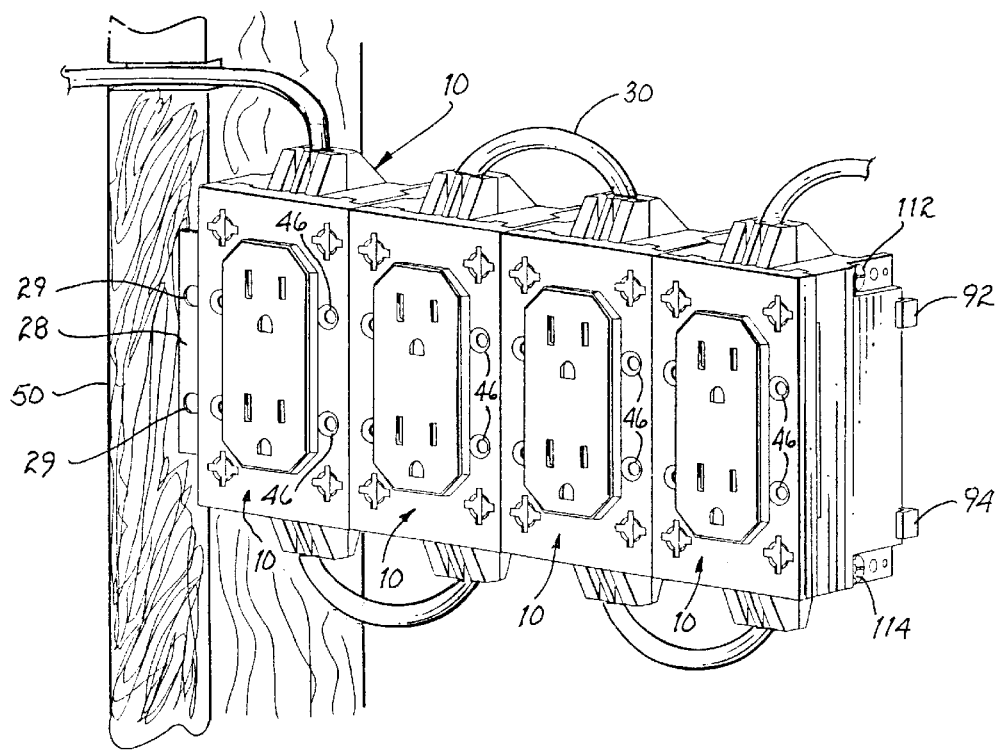
FIG. 19 illustrates a plurality of ganged electrical outlet boxes and a common uncut electrical cable extending serially through each.

FIG. 19 illustrates an electrical outlet box 10 attached to a stud 50 via flange 28. Such attachment may be by screws, nails, or the like penetrating apertures 29 and into engagement with the stud. Several additional electrical outlet boxes 10 are serially ganged to the stud supported electrical outlet box through engagement of snap studs 94 of one electrical outlet box engaging slots 82 of the adjacent electrical outlet box and by flange 28 of one box being inserted into an adjacent electrical outlet box and retained in place by bolts or screws extending through apertures 46 and apertures 29 of the inserted flange and into threaded engagement with the underlying posts. Additionally, bolts may extend through two or more of the electrical outlet boxes by penetrable engagement with respective ones of apertures 112, 114.

Figure 20:
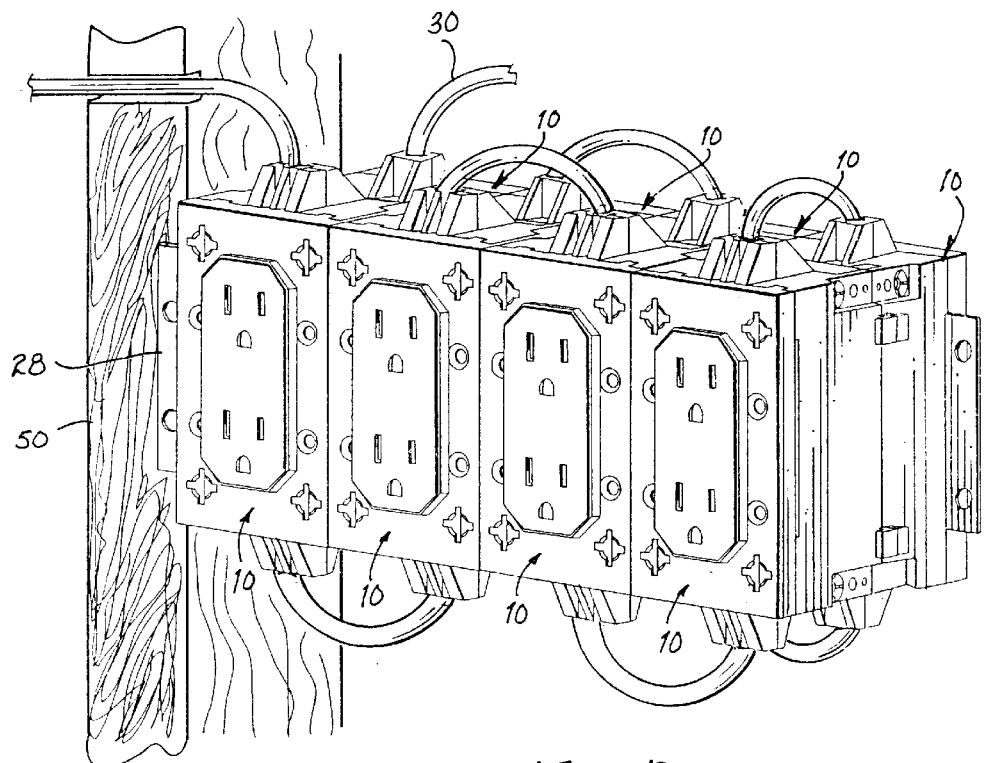
FIG. 20 illustrates a plurality of ganged electrical outlet boxes having further electrical outlet boxes connected thereto back to back and an uncut electrical cable extending serially through each.

A single uncut length of cable 30 is serially located in each of the electrical outlet boxes to define the serpentine path illustrated. Where two or more socket assemblies are intended to protrude at opposed sides of a wall, two sets of gang electrical outlet boxes may be secured back to back as illustrated in FIG. 20. Further details attended such back to back connection are discussed with respective FIG. 4. Herein, a single uncut cable 30 extends serially through each of the electrical outlet boxes.

Figure 21:
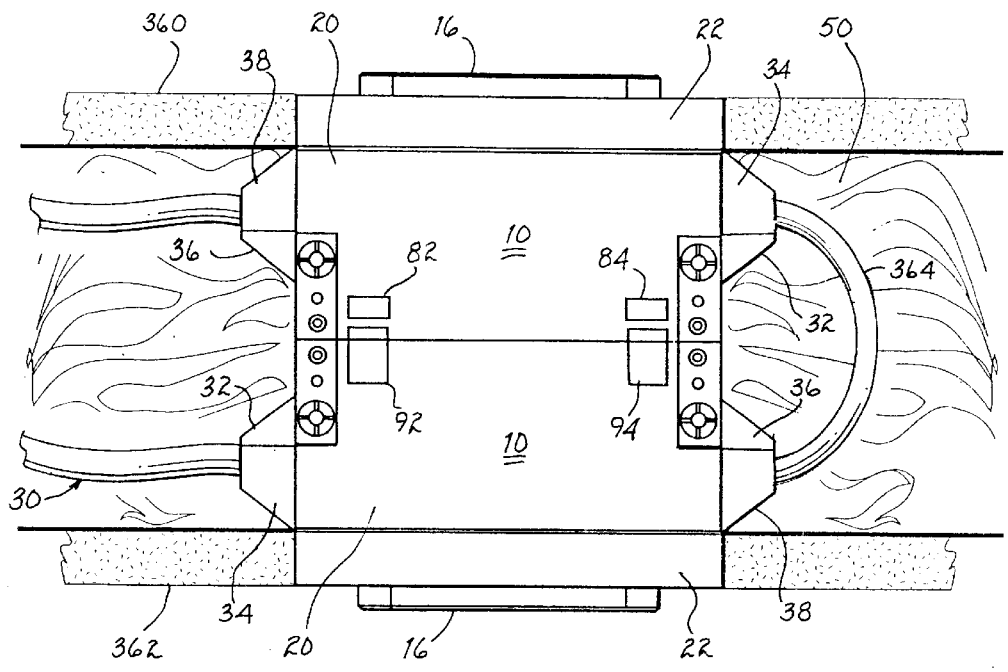
FIG. 21 illustrates a pair of electrical outlet boxes interconnected back to back and an uncut electrical cable extending serially therethrough.

At a location wherein an electrical outlet is desired on opposed sides of a wall, the configuration illustrated in FIG. 21 may be employed. One of electrical outlet boxes 10 is secured to stud 50 via flange 28, as described above. The other electrical outlet box is attached to the anchored electrical outlet box by engagement of tubes 68, 70 of one female member with sets of tubes 64, 62 of the other female member. Herein, a wall board 360 on one side of stud 50 and the wall board 362 on the other side of the stud are illustrated. It may be noted that the thickness of male member 22 extending from respective female member 20 is essentially equivalent to the thickness of the wall board. Socket assembly 16 extending from each male member extends beyond the plane of the outer surface of the corresponding wall board. Cover 24 (not shown herein) extends beyond the perimeter of male member 22 and hides from view the junction between the male member and the side wall of the aperture formed in the wall board. Cable 30 serially extends through each of electrical outlet boxes and may define a loop 364 from one electrical outlet box to the other. The remaining ends of the cable may be connected to a source of electrical power and a further electrical outlet box or electrical fixture of some sort.

Figure 22:
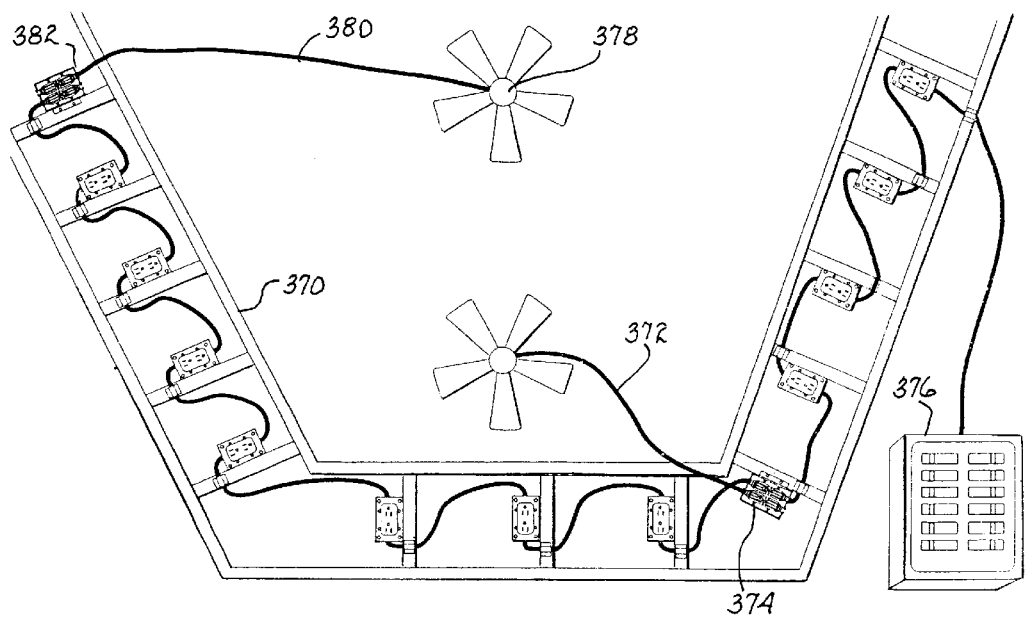
FIG. 22 representatively illustrates a plurality of electrical outlet boxes mounted to studs of a wall and interconnected through a common uncut cable.

FIG. 22 illustrates a plurality of electrical outlet boxes supported by corresponding studs in an extended wall 370. This figure also illustrates extension of a cable 372 from an electrical outlet box 374 wherein such cable is attached to receivers 202 therein by engagement with the clamps of the respective receivers (note FIGS. 15, 16 and 17). A switch box 376 may be employed to control or regulate the power provided to all or some of the electric outlet boxes illustrated. There is also illustrated in this figure an electric ceiling fan 378 receiving electric power through a cable 380 extending from electric outlet box 382.

Figure 23:
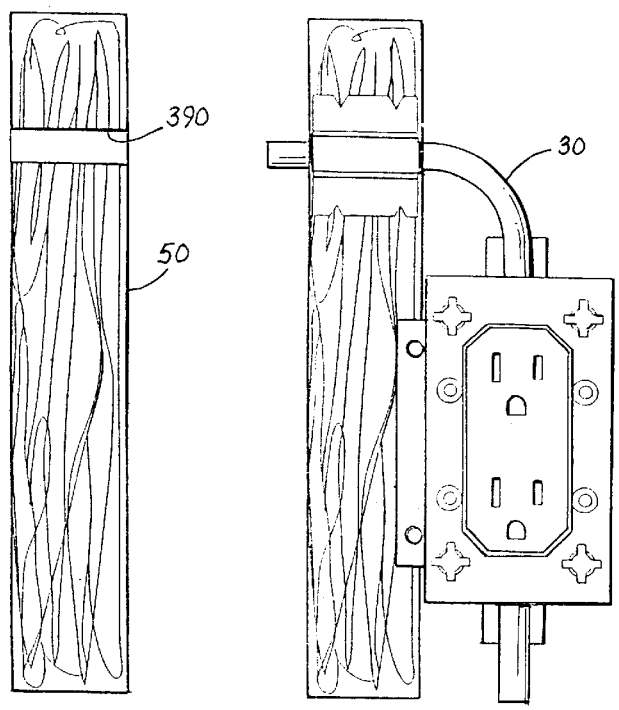
FIG. 23 illustrates an electrical outlet box attached to a stud of a wall and a cable extending therefrom nested within and secured to slots formed in each stud.
Figure 25:
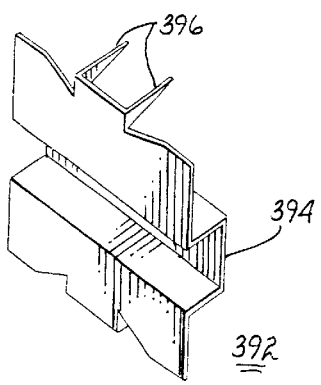
FIG. 25 illustrates a retainer of the type shown in FIG. 23.
Figure 24:
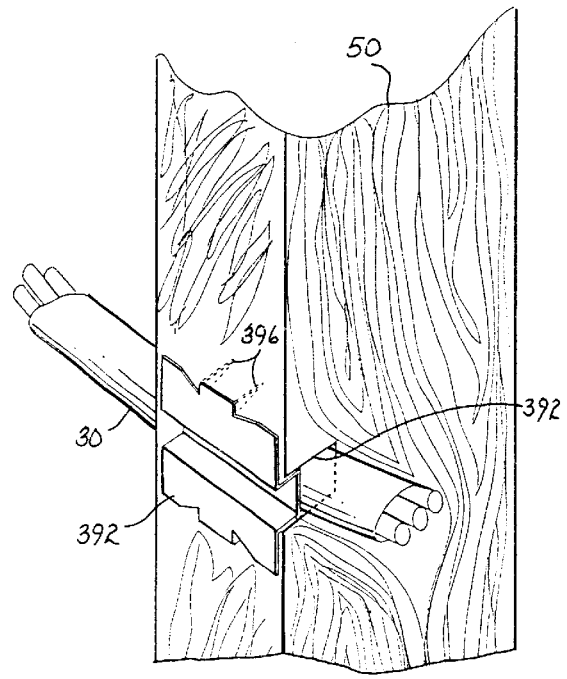
FIG. 24 illustrates a slot in a stud for retaining a cable and a retainer attached thereto to secure the cable in place.
Figure 26:
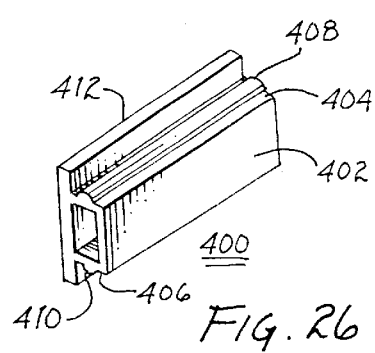
FIG. 26 illustrates a variant retainer for use to retain a cable within a slot.

Conventional practice in wiring a dwelling or other facility involves boring holes through the wall studs and threading an electrical cable therethrough. The threading of such cable, particularly for an extended wall length, is laborious and somewhat difficult due to kinking and coiling of the cable. These problems can be eliminated by instead forming a slot 390 in a wall stud 50, as illustrated FIGS. 23 and 24. Cable 30 is laid in such slot. This avoids the necessity of threading an end of a possibly very long cable through a plurality of wall studs. The cable is retained within the slot by a retainer 392 shown in FIGS. 23, 24 and 25. The retainer is formed as a hat section in cross-section. The hat portion 394 is commensurate with the width of slot 390. The depth of hat portion 394 is less than the depth of the slot to permit cable 30 to lie in the part of the slot not occupied by hat portion 394, as shown particularly in FIG. 24. After cable 30 is laid in a slot, the hat portion of the retainer is inserted into the slot and the retainer is hammered in place. Such hammering will drive pointed prongs 396 into the stud in the manner of nails to retain retainer 392 in place. It may be noted that retainer 392 may be formed from a single sheet of metallic material or other material. A variant 400 of retainer 392 is shown in FIG. 26. This retainer includes a rectangular cross-section element 402 having a height commensurate with the height slot 390. To ensure a friction engagement with the slot, opposed sides 404, 406 may include one of beads 408, 410 for compressive engagement with the side walls of slot 390. A cover plate 412 may be used to bear against the stud but such cover plate is not mandatory. It may be noted that retainer 400 is also retained permanently in place by the wall board covering stud 50.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

I claim:

1. An electrical outlet box, said electrical outlet box comprising in combination:
   (a) female member including three channels, each channel of said three channels receiving an uncut conductor of a three conductor cable, and a flange extending laterally for mounting said electrical outlet box;
   (b) a male member including at least a set of three receivers for engaging the conductors of the cable, each receiver of each said set of three receivers being slotted to pierce any insulation about an engaged conductor of the cable and to electrical interconnect with the engaged conductor of the cable, said male member including a socket assembly for receiving a conventional three prong electrical plug and electrically engaging the prongs of the plug with one set of said sets of three receivers;
   (c) attachment means for securing said male member with said female member, and
   (d) said male member including at least a set of three cavities for housing said set of three receivers to position and maintain said set of three receivers in place upon securing said male member with said female member.

2. An electrical outlet box as set forth in claim 1 including a cover attachable to said male member, said cover including a plurality of studs for penetrably engaging corresponding apertures in said male member to a selectable degree of penetration.

3. An electrical outlet box as set forth in claim 2 wherein each stud of said plurality of studs includes a plurality of bells for selectively engaging said apertures.

4. An electrical outlet box as set forth in claim 1 including means for mounting a pair of said electrical outlet boxes back to back, said mounting means being disposed at the back of said female member and including a plurality of posts at the back of said female member and defining an inscribed circle and a further post having a diameter not less than the diameter of the circle defined by said plurality of posts whereby said post of one of said electrical outlet boxes will mate with and be retained by said plurality of posts of another of said electrical outlet boxes.

5. An electrical outlet box as set forth in claim 4 wherein the back of each said female member includes a pair of said plurality of posts and a pair of said further posts.

6. An electrical outlet box as set forth in claim 1 including at least two of said outlet boxes and means for mounting said electrical outlet boxes side to side, said mounting means including a pair of spaced apart studs disposed proximate the lower edge of one side of said female member of one of said outlet boxes and a pair of indentations disposed proximate the lower edge of an opposing side of said female member of another of said outlet boxes, whereby said pair of studs of one electrical outlet box of said pair of electrical outlet boxes will mate with and engage said pair of indentations of the other electrical outlet box of said electrical outlet boxes.

7. An electrical outlet box as set forth in claim 6 wherein one of said electrical outlet boxes includes a further indentation for receiving said flange of the other electrical outlet box of said electrical outlet boxes and retention means for retaining said flange within said one of said electrical outlet boxes.

8. An electrical outlet box as set forth in claim 7 wherein said female member includes a pair of ledges on opposed sides for supporting the cable into and out of said female member and wherein said male member includes a further pair of ledges mating with said pair of ledges of said female member for retaining the cable therebetween.

9. An electrical outlet box as set forth in claim 1 including a pair of ledges extending from opposed sides of said female member for supporting the cable and a further pair of ledges extending from opposed sides of said male member for clamping the cable between said pair of ledges and said further pair of ledges.

10. An electrical outlet box as set forth in claim 1 including an open ended isolated compartment disposed in said female member and a pair of knockouts for accommodating access to said component by two or more conductors of the cable to be electrically connected within said compartment.

11. An electrical outlet box as set forth in claim 10 including a cover for covering the open end of said compartment and shield any electrical connection therein.

12. An electrical outlet box as set forth in claim 1 wherein each receiver of each said set of three receivers includes a clamp for gripping and electrically engaging a further conductor.

13. An electrical outlet box as set forth in claim 12 wherein each said clamp includes a channel for receiving the conductor and an arm for urging electrical contact between said channel of said clamps and the further conductor.

14. An electrical outlet box as set forth in claim 13 wherein said arm includes an end bent toward said channel of said clamps for engaging the further conductor.

15. An electrical outlet box as set forth in claim 1 wherein each receiver of said set of three receivers includes at least one key and each cavity of said set of three cavities includes a slot for receiving said key of an inserted receiver of said set of three receivers.

16. An electrical outlet box as set forth in claim 1 wherein each slotted receiver of said set of three receivers includes a slot defined by a pair of tabs for electrically engaging the respective conductor of the cable.

17. An electrical outlet box as set forth in claim 16 including a plate having a plurality of apertures, each of said apertures being dimensioned to penetrably receive one pair of said tabs of each receiver of said set of three receivers and retention means for retaining said plate adjacent said set of three cavities.

18. An electrical outlet box as set forth in claim 16 wherein each receiver of said set of three receivers includes two spaced apart pairs of said pair of tabs to define a pair of spaced apart slots for engaging the respective conductor of the cable.

19. An electrical outlet box as set forth in claim 18 wherein each receiver of said set of three receivers includes a pair of resilient arms for gripping therebetween the prong of a plug plugged into said socket assembly.

20. An electrical outlet box as set forth in claim 19 wherein each receiver of said set of three receivers includes a third resilient arm orthogonal to said pair of arms.

21. An electrical outlet box as set forth in claim 20 wherein each cavity of said set of three cavities includes a pair of opposed slots and wherein each third arm of each receiver of said set of three receivers includes a pair of keys extending in opposed directions for engaging said opposed slots of the respective cavity of said set of three cavities.

22. An electrical outlet box as set forth in claim 18 including a plate having three pairs of apertures, each said pair of apertures being dimensioned to receive said spaced apart pair of said pair of tabs to stabilize said set of three receivers upon engagement with the respective ones of the conductors of the cable.

23. An electrical outlet box as set forth in claim 22 wherein said male member, said female member, said socket assembly and said plate are of dielectric material.

24. An electrical outlet box as set forth in claim 1 wherein said male member, said female member and said attachment means are of dielectric material.

25. An electrical outlet box as set forth in claim 1 wherein said female member includes at least a pair of wall sections and said attachment means comprises at least one slot formed in an edge of each of said wall sections and an aperture disposed adjacent each of said at least one slot and wherein said male member includes at least a pair of male studs, each of said male studs engaging at least one of said slots, each said male stud including a lip for a snap fit with the corresponding one of said apertures.

26. An electrical outlet box as set forth in claim 25 wherein said at least one slot comprises a first pair of slots disposed in one of said wall sections spaced apart for a first distance and a second pair of slots disposed in another of said wall sections spaced apart for a second distance and wherein said at least pair of male studs comprises a first pair of male studs spaced apart the first distance for engaging said first pair of slots and a second pair of male studs placed apart the second distance for engaging said second pair of slots.

27. An electrical outlet box as set forth in claim 26 wherein the first and second distances are not equal, whereby said male member can be attached to said female member only in a predetermined orientation therebetween.

28. An electrical outlet box as set forth in claim 1 wherein each channel of said set of three channels is defined by pairs of ridges, each ridge of said pairs of ridges being at least partly discontinuous to accommodate insertion of a part of a respective receiver of said set of three receivers intermediate the discontinuous segments of respective ridges of said pairs of ridges.

29. An electrical outlet box as set forth in claim 1 wherein each channel of said set of three channels is defined by adjacent pairs of ridges, each ridge of each of said pairs of ridges being at least partly discontinuous to accommodate insertion of a part of a respective receiver of said set of three receivers coincident with the discontinuities of the respective ridge of said pairs of ridges.

30. A method for mounting an electrical outlet box, said method comprising the steps of:
 (a) attaching a female member of the electrical outlet box to a wall stud, which female member includes three channels;
 (b) laying an uncut cable through the female member, including the steps of laying each conductor of the cable into a separate one of the three channels;
 (c) mating a male member of the electrical outlet box with the female member, which male member includes at least a set of three receivers, said step of mating including the steps of electrically engaging each conductor of the cable with a corresponding receiver of the set of three receivers defining a socket of the electrical outlet box; and (d) securing said male member with said female member.

31. The method as set forth in claim 30 wherein the electrical outlet box includes a socket assembly comprising a pair of sockets, each of the sockets including the set of three receivers and wherein said step of mating includes the step of engaging each conductor of the cable with a corresponding receiver of each of the sets of receivers.

32. The method as set forth in claim 30 wherein said step of mating comprises the step of piercing any insulation about the conductor of the cable with each receiver of each of three sets of receivers to make electrical contact with the conductor of the cable.

33. The method as set forth in claim 30 wherein the male and female members are of electrically non-conducting material and including the step of limiting flow of electrical power directly and solely from the conductors of the cable to the receivers.

34. The method set forth in claim 30 wherein said step of securing includes the steps of securing the male member to the female member with a snap fit.

35. The method set forth in claim 30 wherein said step of securing includes the step of inserting screws through the male member into threaded engagement with the female member.

36. The method set forth in claim 34 wherein said step of securing includes the step of inserting screws through the male member into threaded engagement with the female member.

37. The method set forth in claim 30 including the step of affixing a cover to the male member.

38. The method set forth in claim 37 wherein said step of affixing includes the step of inserting studs extending from the cover into corresponding apertures in the male member.

39. The method set forth in claim 38 wherein the studs include a plurality of bells and wherein said step of inserting includes the step of inserting a selected member of bells of each of said studs into the corresponding aperture.

40. The method set forth in claim 30 wherein said step of mating includes the step of mounting two electrical outlet boxes back to back, said step of mounting including the step of engaging at least one tube at the back of one female member of one of the electrical outlet boxes intermediate at least a set of tubes at the back of an adjacent female member of the other of the electrical outlet boxes.

41. The method set forth in claim 40 including a pair of tubes disposed at the back of the one female member of the one electrical outlet box and a pair of sets of tubes at the back of the adjacent female member of the other of the electrical outlet boxes and wherein said step of mounting comprises the step of engaging each tube of the pair of tubes of the one female member with one set of tubes of the pair of sets of tubes of the other female member.

42. The method set forth in claim 40 wherein the back of each female member of each of the electrical outlet boxes includes a pair of tubes and a pair of sets of tubes and wherein said step of mating comprises the step of engaging the pair of tubes and pair of sets of tubes of one female member of the one electrical outlet box with the pair of sets of tubes and pair of tubes, respectively, of the other female member of the other electrical outlet box.

43. An electrical outlet box, said electrical outlet box comprising in combination:

(a) a female member, said female member including at least one set of three channels for supporting the conductors of an uncut three conductor cable extending through said female member;

(b) a male member for penetrably engaging said female member in a fixed orientation relative to said female member, said male member including a three hole socket for receiving the prongs of a three prong electrical plug, said male member including three cavities positionally corresponding with said three holes of said socket and with said at least one set of three channels;

(c) a receiver inserted into and supported by each of said cavities, each of said receivers including a pair of opposed resilient arms for gripping a respective prong of said plug plugged into said socket, a pair of tabs defining a slot therebetween for engaging and making electrical contact with a conductor of the cable disposed in one channel of said set of three channels and corresponding with the cavity supporting said receiver upon mating said male member with said female member; and (d) attachment means for securing said male member mated with said female member.

44. An electrical outlet box as set forth in claim 43 including at least two electrical outlet boxes and interlock means disposed in the bottom of said female member for interlocking the bottom of said female member of one of said electrical outlet boxes with the bottom of said female member of another of said electrical outlet boxes.

45. An electrical outlet box as set forth in claim 43 including at least two electrical outlet boxes and interlock means disposed on opposed sides of said female member for interlocking one side of one female member of one of said electrical outlet boxes with another side of another female member of another of said electrical outlet boxes.

46. An electrical outlet box as set forth in claim 43 including a flange extending from said female member for attachment to a wall stud to mount said electrical outlet box.

47. An electrical outlet box as set forth in claim 43 including a ledge extending from each of opposed sides of said electrical outlet box for supporting the cable at the ingress and egress of the cable.

48. An electrical outlet box as set forth in claim 43 wherein each receiver of said set of three receivers includes a clamp for gripping and electrically connecting an end of a further conductor.

49. An electrical outlet box as set forth in claim 43 wherein each of said receivers includes two pairs of tabs defining two slots for engaging and making electrical contact with the respective conductor of the cable.

50. An electrical outlet box as set forth in claim 43 including an apertured plate for penetrably receiving said pairs of tabs and providing support for said set of three receivers.

51. An electrical outlet box as set forth in claim 43 wherein the cable is routed through slots formed in a stud of a wall and including a retainer for retaining the cable in a slot, each said retainer comprising a hat retainer for insertion into the slot and an element for contacting the stud to maintain said retainer in the stud.

52. An electrical outlet box as set forth in claim 51 wherein said element comprises a prong for penetrating the stud.

53. An electrical outlet box as set forth in claim 51 wherein said element comprises a bend compressible against the respective slot.

* * * * *